US012441090B2

(12) United States Patent
Price et al.

(10) Patent No.: US 12,441,090 B2
(45) Date of Patent: Oct. 14, 2025

(54) HIGH OPACITY LAMINATE SURFACE

(71) Applicant: DEPCO-TRH PTY Ltd., Williamstown (AU)

(72) Inventors: David Price, Williamstown (AU); Joseph Giansiracusa, Ascot Vale (AU)

(73) Assignee: DEPCO-TRH PTY Ltd., Victoria (AU)

( * ) Notice: Subject to any disclaimer, the term of this patent is extended or adjusted under 35 U.S.C. 154(b) by 276 days.

(21) Appl. No.: 17/918,349

(22) PCT Filed: Apr. 14, 2021

(86) PCT No.: PCT/IB2021/000244
§ 371 (c)(1),
(2) Date: Oct. 12, 2022

(87) PCT Pub. No.: WO2021/209812
PCT Pub. Date: Oct. 21, 2021

(65) Prior Publication Data
US 2023/0143935 A1    May 11, 2023

(30) Foreign Application Priority Data
Apr. 17, 2020 (EP) .................................... 20170038

(51) Int. Cl.
*B32B 21/10* (2006.01)
*B32B 5/02* (2006.01)
(Continued)

(52) U.S. Cl.
CPC .............. *B32B 21/10* (2013.01); *B32B 5/022* (2013.01); *B32B 7/12* (2013.01); *B32B 33/00* (2013.01); *B32B 38/0012* (2013.01); *B32B 38/06* (2013.01); *B32B 38/145* (2013.01); *B32B 2250/02* (2013.01); *B32B 2255/02* (2013.01); *B32B 2255/24* (2013.01); *B32B 2260/046* (2013.01); *B32B 2262/101* (2013.01); *B32B 2307/306* (2013.01);
(Continued)

(58) Field of Classification Search
None
See application file for complete search history.

(56) References Cited

U.S. PATENT DOCUMENTS

2007/0292618 A1    12/2007   Srinivasan et al.
2008/0312360 A1*   12/2008   Kierkels ................ C09K 21/10
                                                        525/418
(Continued)

FOREIGN PATENT DOCUMENTS

JP        20060205709      *   8/2006
WO        2006040289 A1       4/2006
(Continued)

OTHER PUBLICATIONS

Machine Translation of JP20060205709 (Year: 2006).*

*Primary Examiner* — Shawn Mckinnon
(74) *Attorney, Agent, or Firm* — Michael Soderman

(57) ABSTRACT

A decorative and/or functional laminate using a nonwoven glass fibre material impregnated and or coated with a novel mixture of at least styrene maleic anhydride copolymer amic acid and cyanuric acid and melamine to provide opacity and a laminate surface suitable for printing or painting and/or sealing.

17 Claims, 9 Drawing Sheets

(51) Int. Cl.
  *B32B 7/12*   (2006.01)
  *B32B 33/00*  (2006.01)
  *B32B 38/00*  (2006.01)
  *B32B 38/06*  (2006.01)

(52) U.S. Cl.
  CPC ... *B32B 2307/4023* (2013.01); *B32B 2307/41* (2013.01); *B32B 2307/7145* (2013.01); *B32B 2451/00* (2013.01)

(56) References Cited

U.S. PATENT DOCUMENTS

| | | |
|---|---|---|
| 2017/0253013 A1 | 9/2017 | Li et al. |
| 2017/0321435 A1* | 11/2017 | Chen ................. B32B 37/12 |
| 2018/0354230 A1* | 12/2018 | Zhao ................. B32B 27/20 |
| 2019/0169432 A1 | 6/2019 | Tonouchi et al. |
| 2019/0255815 A1 | 8/2019 | Mattos, Jr. |

FOREIGN PATENT DOCUMENTS

| | | |
|---|---|---|
| WO | 2006111458 A1 | 10/2006 |
| WO | 2012065230 A1 | 5/2012 |
| WO | 2017154995 A1 | 9/2017 |

\* cited by examiner

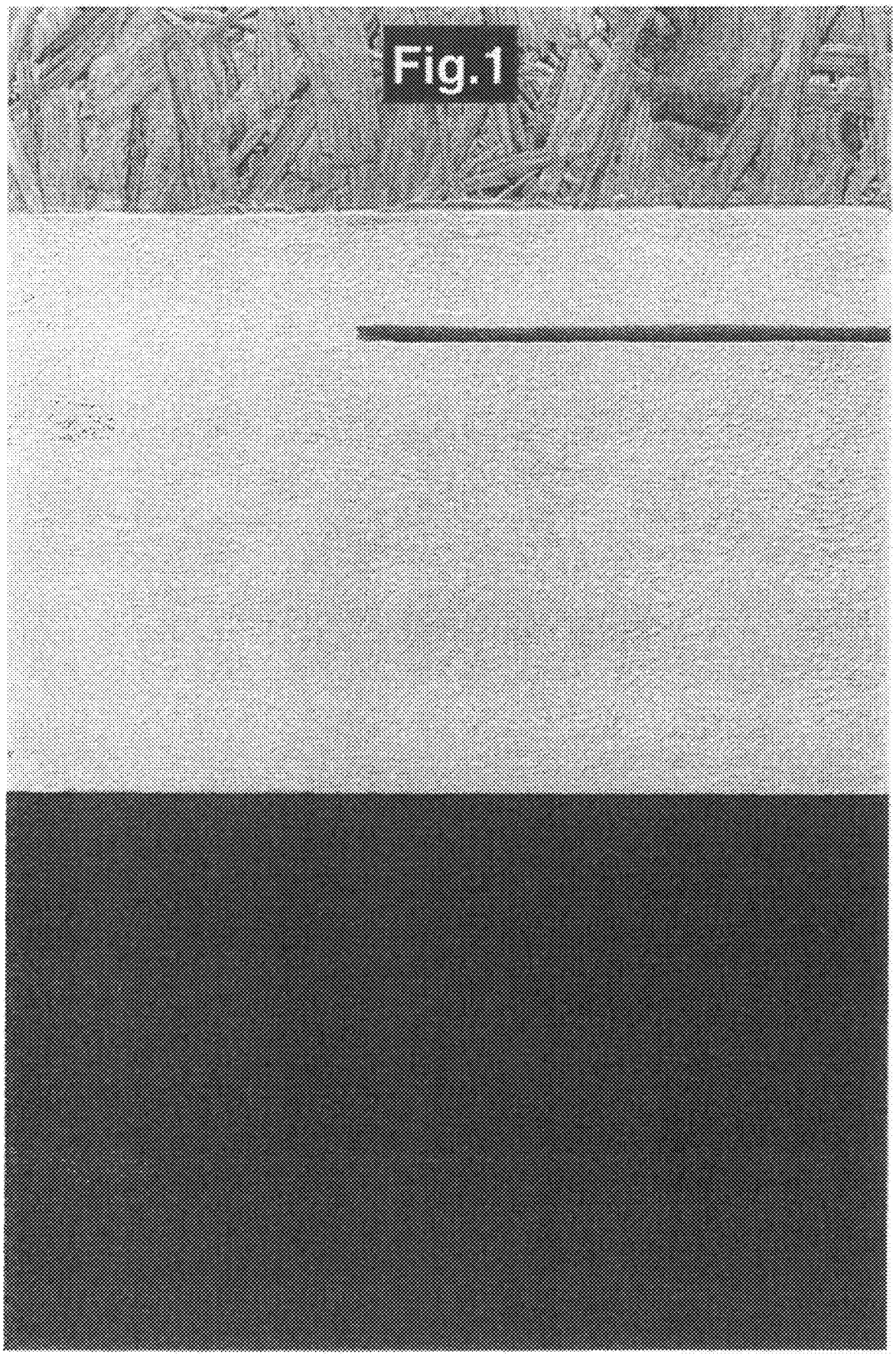

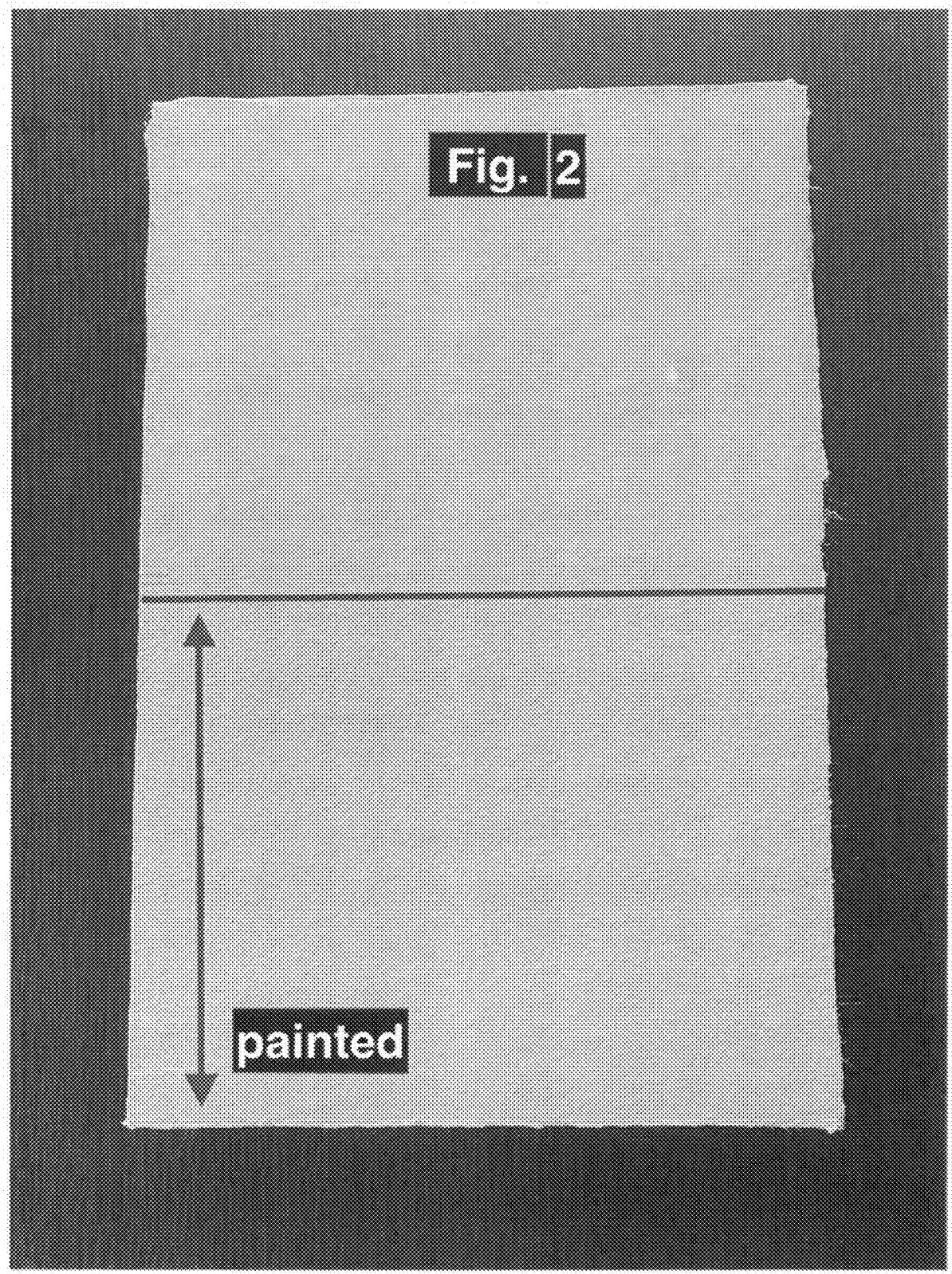

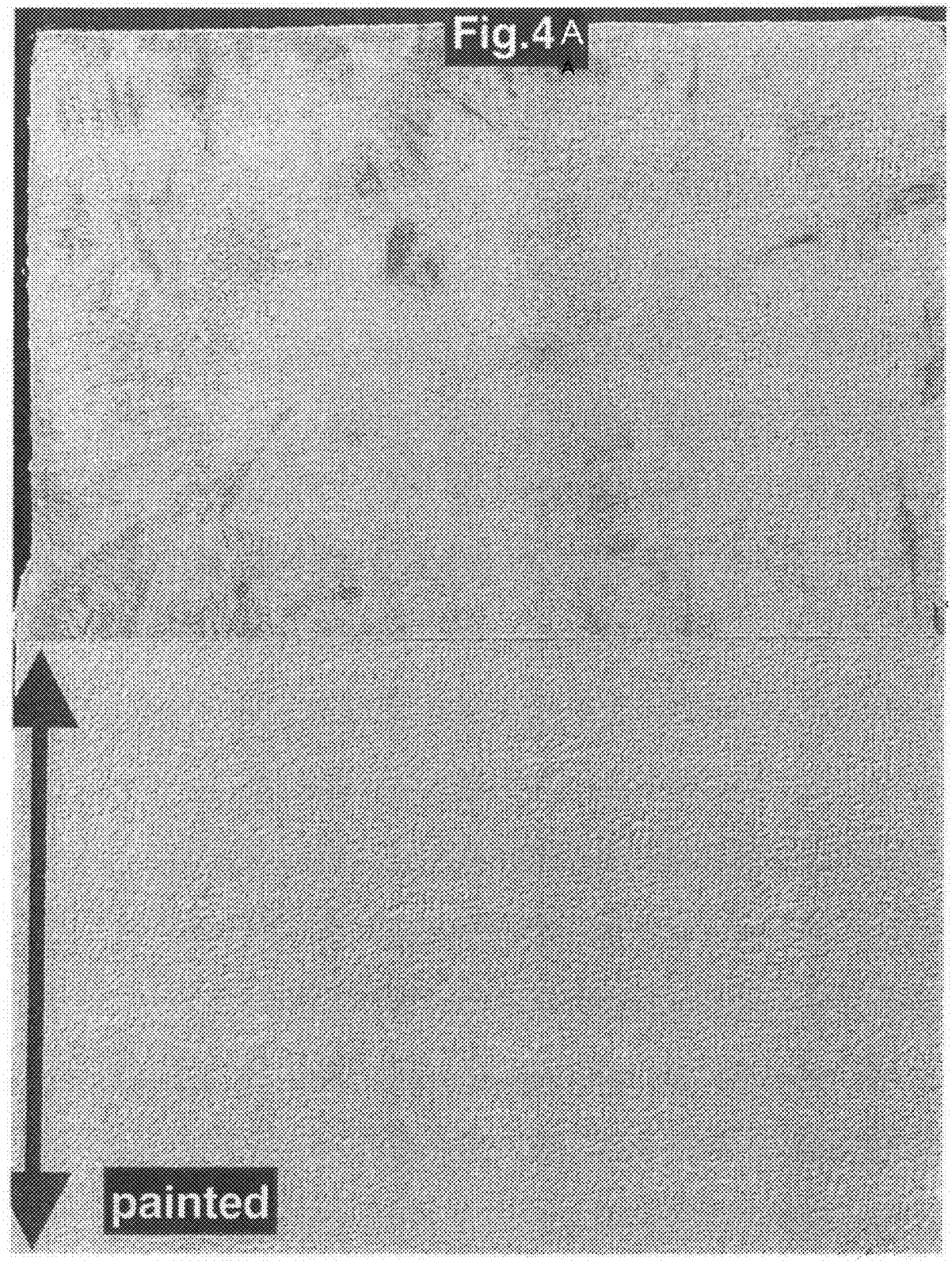

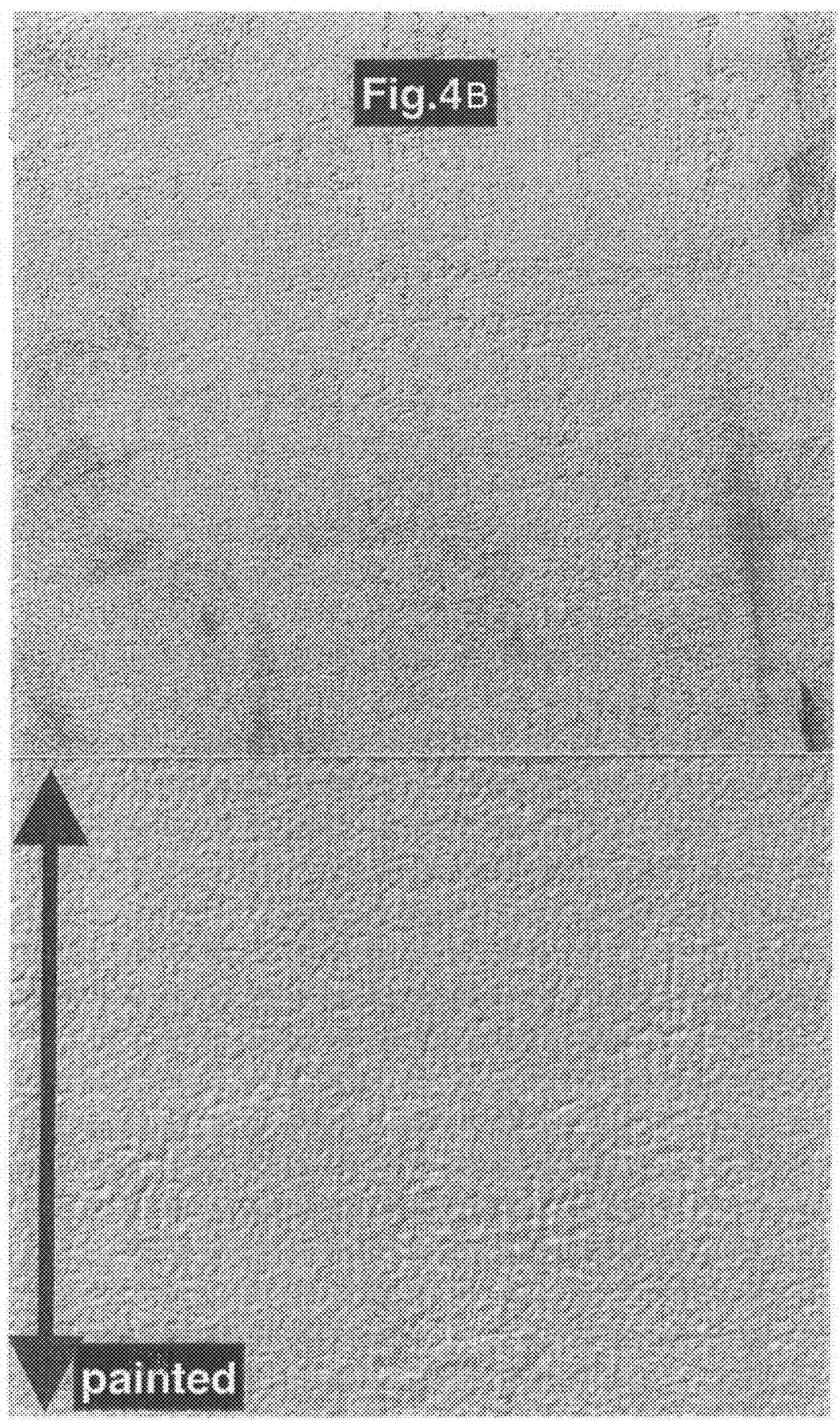

Oriented Strand Board

Glass nonwoven fleece
S = styrene maleic anhydride amic acid
C = cyanuric acid
M = melamine mineral silicate paint

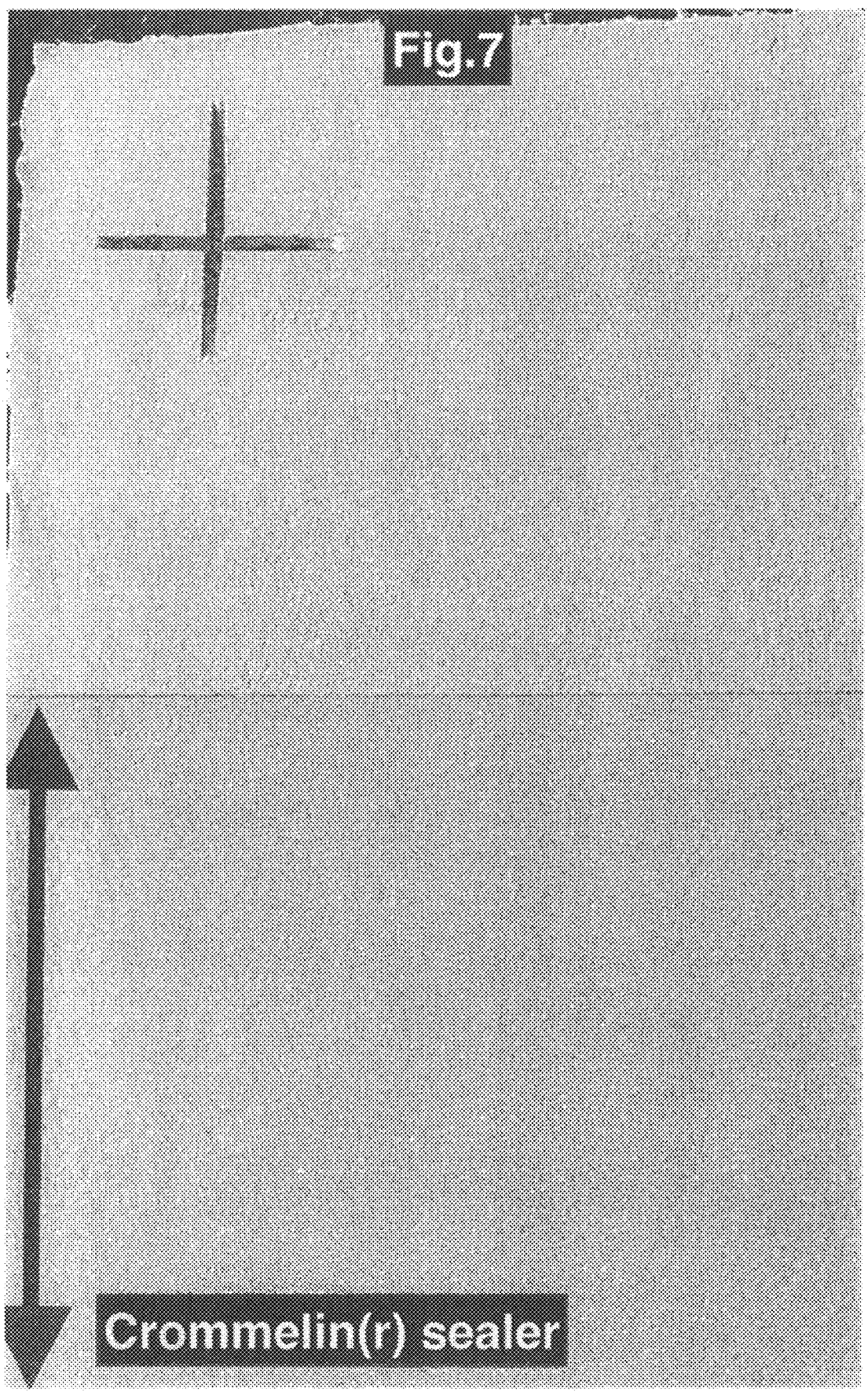

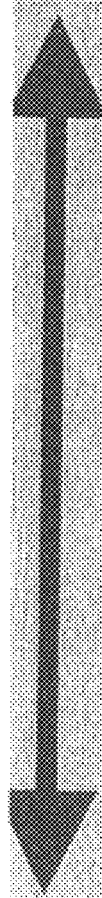

HIGH OPACITY LAMINATE SURFACE

CROSS REFERENCE TO RELATED APPLICATIONS

This application claims the priority of EP 20170038.2 filed on 2020 Apr. 17; this application is incorporated by reference herein in its entirety.

BACKGROUND

The invention relates to a laminate including a substrate material having at least a first surface, and one or more nonwoven glass fibre material layers adhered to at least the first surface.

FIELD OF THE INVENTION

The invention relates to laminates where the surface layer adhered directly to a substrate provides high opacity sufficient to obscure the substrate, and presents a high opacity surface suitable for sealing or decoration by printing or painting. An example of competition products used in the field of the invention are low pressure melamine (LPM) wood-based panels made with a unicolour or printed décor paper impregnated with amino-formaldehyde resins. The invention provides a surface layer with high opacity without use of titanium dioxide as an opacifier, and the surface layer is made without the use of any amino formaldehyde resin.

The task of the present invention is to provide an innovative laminate which reduces the formaldehyde emission significantly as well as a method for producing said laminate.

BACKGROUND OF THE INVENTION

There is a need for alternatives to wood-based panel laminates, such as low pressure melamine (LPM) panels, whereby the material surface that is directly adhered to the wood-based panel laminate avoids the use of formaldehyde containing resins and does not require TiO2 to provide opacity. It is also desirable to be able to print on or paint the surface of the laminated panel, and to develop processes that allow for the inclusion of heat-sensitive and or pressure-sensitive materials in the surface of the wood-based panel laminate.

Laminated wood-based panels, such as LPM panels, are in widespread use in a variety of applications including as building materials, flooring, wall panelling, furniture, cabinetry and other items such as packaging. Typically, the majority of wood-based panels, such as particleboard and medium density fibreboard, are made using a binder resin that includes formaldehyde, for example urea formaldehyde. The emphasis in reducing formaldehyde emissions has increased not least due to new regulations regarding formaldehyde emissions including from wood panels, for example EN16516, and has led to the continued development of alternative resins for use in wood-based panels, such as polymeric diphenyl methylene diisocyanate (pMDI) or biopolymers (Ecosynthetix, DuraBind™).

Formaldehyde is a highly reactive, acutely toxic gas and a genotoxic carcinogen. Exposure to formaldehyde has been shown to cause some types of cancers. The exposure is usually by breathing formaldehyde containing air during manufacture of goods using formaldehyde and/or from emissions from the goods after manufacture. In industry, formaldehyde is used as a chemical intermediate to manufacture formaldehyde-based resins and other chemicals. Formaldehyde off-gassed from articles produced using formaldehyde-based substances contributes to consumer exposure, especially in indoor environments. Composite wood-based panels, which use formaldehyde-based resins as a bonding agent for wood particles, and articles made from such panels (e.g. furniture) are potential formaldehyde emission sources.

There is regulatory pressure to reduce the emission of formaldehyde in industry including the reduction of emissions of formaldehyde from woodpanel products containing formaldehyde. The European Chemicals Agency (ECHA) has proposed restrictions on formaldehyde emissions on consumer articles marketed or used in the European Union. This has created an increased pressure for industry to either (i) reduce formaldehyde emissions from products traditionally made with formaldehyde based resins or (ii) develop alternative forms of products traditionally made with formaldehyde based resins. Significant quantities of oriented strand board (OSB) are made with pMDI binder, commonly referred to as a No Added Formaldehyde (NAF) resin.

It is known that wood itself used in woodbased panels is also a source of formaldehyde emissions, making it virtually impossible to have a wood-based panel with zero VOCs.

In addition, one form of decorative wood-based panel known as a low pressure melamine laminate (LPM) panel uses an amino formaldehyde resin impregnated décor paper which is bonded directly to the woodpanel and is commonly used in flooring, panelling and various kitchen & bathroom fixtures as well as other furniture items. Décor papers use a significant amount of titanium dioxide (TiO2) to provide opacity, in some cases up to 40% of the weight of the décor paper is TiO2. The LPM woodpanel laminate is made by applying heat & pressure in a short cycle press to thermally fuse the resin impregnated décor paper to the woodpanel and present a hardwearing decorative surface. Manufacture of decorative low-pressure melamine (LPM) panels requiring heat and pressure limits the use of materials that can be used in their production by excluding some heat and/or pressure sensitive materials.

Furthermore, the European Union published on 18 Feb. 2020 a delegated regulation classifying titanium dioxide (TiO2) as a category 2 suspected carcinogen by inhalation under EU Regulation (EC) No 1272/2008 on classification, labelling and packaging (CLP) of substances and mixtures.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

The invention provides a new combination of materials suitable for use in manufacturing a decorative laminate as an alternative to traditional low pressure melamine (LPM) decorative laminates. The invention can completely replace the use of the amino-formaldehyde resin impregnated décor paper which provides the decorative and functional surface of the LPM decorative panel. Replacing the décor paper, which generally uses titanium dioxide (TiO2) to provide opacity, presents an opportunity for a reduction of both formaldehyde and TiO2 in the surface layer of a decorative laminate panel.

DETAILED DESCRIPTION

The invention uses a nonwoven glass fibre material surface layer impregnated and or coated with a mixture of styrene maleic anhydride copolymer amic acid, cyanuric acid and melamine to provide adequate opacity to obscure the substrate material without using titanium dioxide, and without any formaldehyde in the impregnation/coating composition, and being a printable or paintable or sealable surface. The substrate material of the laminate may be a wood based material, preferably a reconstituted wood-based panel. The laminate has at least as one surface the impregnated/coated nonwoven glass fibre material layer suitable for printing or painting or sealing. The impregnation/coating of the nonwoven glass fibre material may occur before or after gluing the nonwoven glass fibre material to the substrate, or be a combination of 2 or more impregnation/coating steps. The impregnation/coating of the nonwoven glass fibre material may be a partial impregnation before gluing to the substrate followed by another impregnation/coating step. The impregnation/coating material is a mixture of styrene maleic anhydride copolymer amic acid, cyanuric acid and melamine, with optional additional chemicals for functional or decorative effect.

Replacing the décor paper with a nonwoven glass fibre material, also known as nonwoven glass fleece (in German, glasvlies), and impregnating/coating the nonwoven glass fibre material with a mixture of styrene maleic anhydride copolymer amic acid, cyanuric acid and melamine provides a laminated panel with opacity to obscure the underlying substrate, and present a printable or paintable or sealable surface. Whether or not the laminate surface of impregnated/coated nonwoven glass fibre material is printed or painted, it is an option that the surface can be sealed to improve characteristics such as durability, weatherability including UV resistance, or cleanability.

Nonwoven glass fibre materials are made from chemically bonded, randomly dispersed glass fibres available in a range of weights (g/m2). For example, Ahlstrom-Munksjo offer a weight range from 20-120 g/m2. The weight range for the nonwoven glass fibre material is not limited to 20-120 g/m2 and more than one layer of nonwoven glass fibre material may be used.

In a first aspect, the present invention provides a laminate including a substrate material, and having at least one surface of the substrate laminated with one or more intermediate layers of impregnated/coated nonwoven glass fibre material adhered to the surface of the substrate. The composition of the material used to impregnate/coat the nonwoven glass fibre material consists of a combination of styrene maleic anhydride copolymer amic acid, cyanuric acid and melamine. It is an option for the impregnation/coating material to be pigmented, for example with Bayferrox Gelb 920 (Lanxess Germany) to obtain a beige hue, and may contain an antimicrobial additive, for example polyhexamethylene biguanide (Lonza, Switzerland). The impregnation/coating material consisting of styrene maleic anhydride copolymer amic acid, cyanuric acid and melamine may be modified to enable a decorative or tactile effect, such as the addition of magnesium sulphate, preferable magnesium sulphate heptahydrate, which creates a cracked or distressed surface effect.

The impregnation/coating of the intermediate nonwoven glass fibre material layer with the combination of styrene maleic anhydride copolymer amic acid, cyanuric acid and melamine may occur before or after the intermediate nonwoven glass fibre material layer is glued to the surface of the substrate. The impregnation/coating of the intermediate nonwoven glass fibre material layer may also be in more than 1 stage, for example partial impregnation before gluing to the substrate and a further impregnation/coating after gluing to the substrate. When the substrate is a panel, the impregnated/coated nonwoven glass fibre material according to the invention may also be applied to the reverse side of the panel. Alternatively, there may be applied to the reverse surface of the panel one or more material layers chosen to perform one or more functions such as heat reflection, electromagnetic radiation reflection, a moisture barrier, an airtight barrier, or sound dampening. Optionally, the surface of the laminated panel presenting the impregnated/coated nonwoven glass fibre material is sealed to improve durability.

In a second aspect, the surface of the impregnated/coated nonwoven glass fibre material is decorated by printing. Optionally, the impregnated/coated nonwoven glass fibre surface has a primer or an ink receiving layer applied before printing. After printing, the printed surface optionally has a clear protective coating applied.

In a third aspect, the surface of the impregnated/coated nonwoven glass fibre material is decorated by painting. The paint may be a functional paint, or may be a decorative paint. The paint may be suitable for interior or exterior applications.

In a fourth aspect, the surface of the printed or painted impregnated/coated nonwoven glass fibre material has a functional protective coating.

In a fifth aspect, the surface of the impregnated/coated nonwoven glass fibre material has a coating which contains heat or pressure sensitive materials.

The following embodiments are applicable to all aspects of the invention.

In one embodiment the substrate material of the invention is a wood-based composite material. In some embodiments, the wood-based composite material is a wood-based panel optionally selected from the group consisting of plywood, particleboard, fibreboard (such as medium density fibreboard (MDF) or high density fibreboard (HDF)), waferboard, or oriented strand board (OSB). The use of the impregnated/coated nonwoven glass fibre material layer according to the invention can also be used as a functional and or decorative surface on laminated veneer lumber (LVL), cross laminated timber (CLT), solid wood as well as metallic or plastic materials (FIG. 6). The wood-based panel is optionally a combination of wood-based materials. In some embodiments, the wood-based panel is a combination of one or more of MDF, OSB, plywood, wood veneer and particleboard, such as but not limited to MDF and OSB, or particleboard and wood veneer, or OSB and wood veneer, or OSB and thin MDF. The wood-based panel may balsa wood or a structure of balsa wood and thin MDF, or balsa wood and thin particleboard, or balsa wood and a Mende Process panel.

The intermediate nonwoven glass fibre material layer or layers whether not yet impregnated or coated, or whether already fully or partially impregnated/coated with a mixture of styrene maleic anhydride copolymer amic acid, cyanuric acid and melamine, are bonded to at least a first surface of the support material using an adhesive, for example a multipurpose adhesive (Selleys® ALLFIX). The intermediate nonwoven glass fibre layer or layers may be bonded to the substrate before application of the impregnating/coating material, or may be partially impregnated before being adhered to the substrate, and a further application of the impregnating/coating material made to the surface of the laminate before printing or painting or sealing.

The impregnated/coated nonwoven glass fibre material surface may be printed by any practical printing method. Examples of printing methods are inkjet printing, or dye sublimation, or screen printing. Optionally, a primer or a print receiving layer is applied to the impregnated/coated nonwoven glass fibre material surface before printing. Optionally, a clear protective layer is applied after printing.

Where the impregnated/coated nonwoven glass fibre material surface is painted, it is an option to use a primer before painting. The paint may be for interior or exterior applications. To improve flame retardancy of the panel surface a fire retarding intumescent paint may be used. If the application of the panel is indoors it is an option to chose paint with low VOC emission, for example a mineral silicate paint. Furthermore, if the panel is for external applications, weather resisting paints can be chosen, for example paints based on fluoropolymer and polyisocyanate such as Fluorex (Chugoku Marine Paints, Japan).

In some embodiments, the impregnated/coated nonwoven glass fibre material surface may be painted with a sealer, for example Crommelin® DiamondCoat.

In some embodiments, the laminate surface may contain an antimicrobial additive such as polyhexamethylene biguanide (PHMB), or an inorganic silver antimicrobial (IONPURE, Ishizuka Japan), or a thermochromic material (Yamamoto, Japan).

In a sixth aspect, the present invention provides a wall, a ceiling, a floor, a room divider, a benchtop, cabinetry and/or furniture. The laminates of the invention can be applied to form a wall or ceiling and optionally, may be used in combination with plasterboard. Optionally, the impregnated/coated nonwoven glass fibre material surface of the substrate material is the visible facing of a wall, a ceiling, a floor, a room divider, a benchtop, cabinetry and/or furniture. Optionally, the second surface of the panel provides a functional material coating such as but not limited to heat reflection, electromagnetic radiation reflection, a moisture barrier, an airtight barrier, sound dampening or any combination of these functional objectives.

In a seventh aspect, the present invention provides a process for preparing a laminate including:
   (a) adhering one or more intermediate nonwoven glass fibre material layers to at least a first surface of a substrate material having at least a first surface and a second opposing surface;
   (b) applying the mixture of styrene maleic acid copolymer amic acid, cyanuric acid and melamine to the intermediate nonwoven glass fibre material layer;
   (c) allowing or enabling the impregnation/coating mixture to dry;
   (d) applying a ink receiving layer to c)
   (e) printing the impregnated/coated nonwoven glass fibre material surface; and
   (f) applying a protective coating to the printed surface;

Optionally, the intermediate nonwoven glass fibre material layer may be partially or fully impregnated before being bonded to the substrate material.

Optionally, printing of the intermediate impregnated/coated nonwoven glass fibre material layer may occur before the intermediate impregnated/coated nonwoven glass fibre material layer is adhered to the substrate material.

Optionally, a suitable primer is applied to the intermediate impregnated/coated nonwoven glass fibre material layer before painting. The primer is either allowed to dry passively or is actively dried by, for example, hot air or an infrared radiation drier whether IR or NIR, or by microwave drying before application of the paint, for example a mineral silicate paint (Porter's Mineral Silicate Stain Clear).

Optionally, after impregnation/coating of the nonwoven glass fibre material layer and adhesion to the substrate, the impregnated/coated nonwoven glass fibre material layer may be sanded.

Optionally, the impregnated/coated nonwoven glass fibre material surface may be textured before printing or painting. The texture may be achieved by an embossing pressed into the surface of the impregnated/coated nonwoven glass fibre surface, or alternatively the surface haptic is created during the printing process.

Further aspects of the present invention and further embodiments of the aspects described in the preceding paragraphs will become apparent from the following description, given by way of example and with reference to the accompanying drawings or images.

BRIEF DESCRIPTION OF THE DRAWINGS

The following are shown in the accompanying drawings:
FIG. 1 shows the impregnation of glass fibre tissue and adherence to OSB,
FIG. 2 shows adherence of glass fibre tissue to OSB and impregnation,
FIG. 3 shows the painting of an impregnated nonwoven glass fibre surface on OSB,
FIG. 4A shows a first instance of modified impregnation material to create texture,
FIG. 4B shows a second instance of modified impregnation material to create texture,
FIG. 7 shows a sealing surface of an impregnated nonwoven glass fibre surface,
and
FIG. 8 shows an impregnation material using melamine cyanurate.

DETAILED DESCRIPTION OF THE PREFERRED EMBODIMENTS

Figure 5:
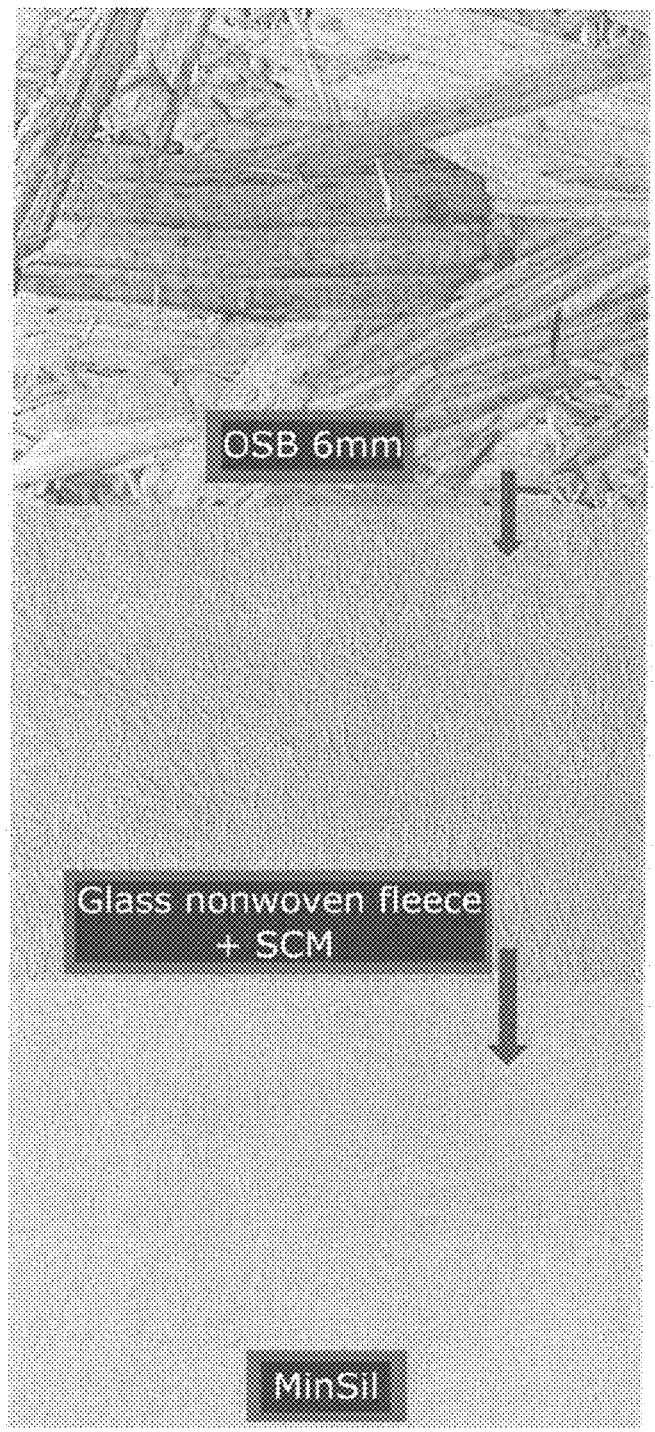
FIG. 5 shows 3 stages in the making of a laminate of the invention.

Reference will now be made in detail to certain embodiments of the invention. While the invention will be described in conjunction with the embodiments, it will be understood that the intention is not to limit the invention to those embodiments. On the contrary, the invention is intended to cover all alternatives, modifications, and equivalents, which may be included within the scope of the present invention as defined by the claims.

Further aspects of the present invention and further embodiments of the aspects described in the preceding paragraphs will become apparent from the following description, given by way of example.

All of the patents and publications referred to herein are incorporated by reference in their entirety.

For purposes of interpreting this specification, terms used in the singular will also include the plural and vice versa.

One skilled in the art will recognize many methods and materials similar or equivalent to those described herein, which could be used in the practice of the present invention. The present invention is in no way limited to the methods and materials described.

The inventors of the present invention have developed an alternative to modern woodpanel based decorative low pressure (LPM) laminates. The invention is suitable for use, for example, in the manufacture of a wall, ceiling, floor, room divider, benchtop, cabinetry and/or furniture.

In some embodiments, the invention involves the application of one or more intermediate impregnated/coated nonwoven glass fibre material layers adhered to at least one surface of a wood-based panel substrate.

In alternate embodiments the invention involves printing, such as inkjet printing, or painting of the impregnated/coated nonwoven glass fibre material layer. Furthermore, the impregnated/coated nonwoven glass fibre surface may be sealed to improve durability.

The decorative surface of the invention avoids the use of décor paper impregnated with amino-formaldehyde resins, such as urea formaldehyde and/or melamine formaldehyde-based resins commonly used in the preparation of modern low pressure (LPM) laminates. The mixture of styrene maleic anhydride copolymer amic acid, cyanuric acid and melamine does not require any additional opacifying agent to provide adequate opacity, however the colour may be modified by addition of colour pigments or dyes.

The laminate of the invention minimises or avoids the application of sustained direct heating for production. While some heating can be used to assist drying when that improves productivity, the application of sustained direct heating under pressure is not required and can be avoided or used with reduced intensity to allow for the use of heat and pressure sensitive materials in the laminate surface.

As used herein, except where the context requires otherwise, the term "comprise" and variations of the term, such as "comprising", "comprises" and "comprised", are not intended to exclude further additives, components, integers or steps.

The term "laminate" refers to a material having one or more layers adhered to at least one side of a substrate.

The term "decorative laminate" refers to a laminate with at least one decorated surface intended to be visible in a final product.

The term "wood-based panel" refers to a composite wood panels made primarily from wood or wood derived ingredients such as wood chips, wood fibres, wood strands. Examples of wood-based panels include plywood, particleboard, fibreboard such as medium density fibreboard (MDF) or high density fibreboard (HDF), waferboard, oriented strand board (OSB).

The term "impregnated/coated" and variants such as "impregnation/coating" refers to the method of how the mixture of styrene maleic anhydride copolymer amic acid, cyanuric acid and melamine are incorporated into and or onto the nonwoven glass fibre material before and or after the nonwoven glass fibre material is attached to the substrate, and are not intended to exclude similar methods to achieve a surface layer of the laminated panel that presents as the outer surface the nonwoven glass fibre material containing the mixture of styrene maleic anhydride copolymer amic acid, cyanuric acid and melamine.

Substrate Material

The substrate material can be any material suitable for the end use of the product of the invention having a surface to which the intermediate impregnated/coated nonwoven glass fibre material layer or layers are adhered and suitable for the application of the decoration, printing, painting or protection coating as desired.

In preferred embodiments, the substrate material is a panel, preferably a wood-based panel. Generally, the choice of wood-based panel depends on the end application, nevertheless any wood-based panel may be taken as the substrate material, for example plywood, particleboard, fibreboard such as medium density fibreboard (MDF) or high density fibreboard (HDF), waferboard, oriented strand board (OSB). The inventive intermediate nonwoven glass fibre material layer impregnated/coated with a mixture of styrene maleic anhydride copolymer amic acid, cyanuric acid and melamine, can also be used as a functional and or decorative surface on laminated veneer lumber (LVL), cross laminated timber (CLT), solid wood as well as metallic or plastic surfaces. Combinations of wood panel products may be used, as well as woodpanel products and non wood based materials.

The wood-based panel or other substrate material can be sanded prior to application of the intermediate impregnated/coated nonwoven glass fibre layer or layers to either enhance adhesion of the intermediate layer or layers or to smooth out the surface of the substrate material to enhance the regularity of the surface of the finished product.

Where there is a surface of the laminate not intended to be visible in the final application of the laminate, that surface can have one or more coatings or material layers applied to provide for example but not limited to heat reflection, electromagnetic radiation reflection, a moisture barrier, an airtight barrier, sound dampening, or combinations of the functions.

Intermediate Layer

The intermediate layer or layers are nonwoven glass fibre material and are adhered to the wood-based panel using an adhesive.

The intermediate nonwoven glass fibre material layer may be impregnated/coated before or after being adhered to the substrate. Alternatively, the nonwoven glass fibre material may be partially impregnated before adhesion to the substrate, and an additional impregnation/coating made after adhesion to the substrate.

An example of non woven glass fibre materials are nonwoven glass fibre (glasvlies) manufactured by Ahlstrom-Munksjo Finland, described as made from chemically bonded, randomly dispersed glass fibres, and available in a weight range from 20-120 $g/m^2$. For example "glassfiber tissue GFT-25K13-70", is a 70 $g/m^2$ white nonwoven glass fibre material.

The surface of the laminate of the invention may smooth, or optionally have a texture or embossing.

To improve productivity the drying process of any stage of manufacture may be accelerated by the application of energy, for example, direct radiation heating such as IR or NIR, or microwave, or indirectly by use of hot air. The hot air may advantageously be exhaust air from a NIR drying unit.

There may be more than one intermediate nonwoven glass fibre material layer. The intermediate layers may be the same material or may be different, for example different weight ($g/m^2$), different colour, or glass fibre geometry. Intermediate nonwoven glass fibre material layers may be combined before application to the substrate material.

Impregnation of the Nonwoven Glass Fibre Material

The nonwoven glass fibre material is impregnated/coated with a mixture of styrene maleic anhydride copolymer amic acid, cyanuric acid and melamine. The impregnation/coating of the nonwoven glass fibre material may occur before or after adhesion of the nonwoven glass fibre material to a substrate. Impregnation/coating may be completed in one application or may be in two or more stages, for example, partial impregnation of the nonwoven glass fibre material before adhesion to the substrate and further coating of the impregnating mixture into the nonwoven glass fibre material after adhesion to the substrate.

Impregnation Mixture

The impregnating/coating mixture is made by combining styrene maleic anhydride copolymer amic acid with cyanuric acid and melamine. In a preferred method the cyanuric acid powder is added into an aqueous solution of styrene maleic anhydride copolymer amic acid and stirred until a exothermic reaction occurs causing the viscosity of the mixture increase. If the viscosity increases to a point where it is difficult to stir the material, a solvent such as water may be added. Subsequently, melamine is added to the mixture in an amount substantially equivalent to the amount of cyanuric acid. The combination of cyanuric acid and melamine to provide enhanced opacity in decorative laminates is disclosed in patent WO2012/065230, however the reaction of cyanuric acid with styrene maleic anhydride copolymer amic acid was not foreseen and is part of this invention. An exemplary ratio of materials is:

100 g styrene maleic anhydride copolymer amic acid (30% solids)
166 g cyanuric acid (powder)
165 g melamine (powder)
291 g water While it is preferred to have separate addition steps for combining cyanuric acid and melamine with the styrene maleic anhydride copolymer amic acid, it is practical to combine the cyanuric acid and melamine before mixing with styrene maleic anhydride copolymer amic acid. While it is currently more economic to purchase cyanuric acid and melamine as individual items, the use of melamine cyanurate (melamine—cyanuric acid complex) mixed with styrene maleic anhydride copolymer amic acid is a further option. An exemplary ratio of materials is:

100 g styrene maleic anhydride copolymer amic acid (30% solids)
300 g melamine cyanurate
140 g water The impregnation mixture may be further dispersed in a solvent, for example water, to enable impregnation on a standard impregnation line (VITS Germany), or may be in a malleable form that flows under pressure and be forced into and onto the nonwoven glass fibre material. Other functional materials may be added to the mixture, for example magnesium sulphate heptahydrate (Epsom salts), to create different surface textures. See FIG. 4a & FIG. 4b Painting of the Impregnated Nonwoven Material Surface The choice of paint is not limited and may involve more than one coating and more than one type of paint. For example, a mineral silicate surface coating generally supplied in a liquid paint form may be used. Mineral silicate paints are derived from silica ($SiO_2$) and a carbonate of lithium, sodium or potassium. Waterborne silicates are glasses with a wide variety of molecular structures in which the anions are monomers, dimers, trimers, branched chains, ring structures, and other three dimensional networks. Suitable paints are commercially available, for example from KEIM Germany, or Beeck Germany, or Porters Australia. Other providers of mineral silicate based paints are StoColor Min, Alpina, Carapol, Schoene Wohnen or house-branded products such as offered for sale by Hornbach are also suitable.

These paints are substantially volatile organic chemical (VOC) free, water based and non-toxic. They contain one or more alkali metal silicates such as potassium-based alkali silicate (potassium silicate—$SiO_2/K_2O$) in a solvent. The ratio of silicon dioxide to alkali metal oxides vary. A higher ratio (eg 3.75:1 $SiO_2:K_2O$) gives lower viscosity, faster drying & curing, improved chemical resistance, increased susceptibility to low temperature. A lower ratio (eg 2:1 $SiO_2:K_2O$) gives a higher specific weight, greater solubility, higher pH, greater susceptibility to water, higher tack and binding power. Ratios of 1.5 or higher are most common commercially.

A mineral silicate coating material may also be referred to as an alkali metal silicate, or waterglass, and may be modified, for example with a silica sol. Sol-silicate paints can include 10% or less organic binder and bind by both physical and chemical bonds These silicate paints can include low levels of a polymeric organic emulsion (eg 5%) with the alkali silicate in water. The polymeric organic emulsion protects the alkali silicate from water during silification, which can take weeks. The paints can also be flexibilized by 1-5% glycerine or another polyhydric alcohol.

The mineral silicate paint with or without added colour (pigmentation or dyes) may be further painted with a commercial paint to acquire a functional aspect such as enhanced UV resistance, or fire retardancy, or provide a decorative aspect.

An antibacterial material can also optionally be added to the mineral silicate paint.

The mineral silicate coating can be applied to the impregnated/coated nonwoven glass fibre material layer before adhesion to the wood-based panel, or the mineral silicate coating can be applied to the impregnated/coated nonwoven glass fibre material layer after the impregnated/coated nonwoven glass fibre material layer has been adhered to the wood-based panel.

It is an option to apply a mineral silicate primer to the intermediate impregnated/coated nonwoven glass fibre material layer before application of the mineral silicate coating- or coatings. If a primer is applied, it is usual to allow the primer time to dry before application of the mineral silicate coating-(s). Where suitable the drying process can be sped up by the application of energy, for example, as direct heating such as IR or NIR, or microwave, or indirectly by use of hot air.

The primer layer and each mineral silicate coating may be sanded prior to application of the next mineral silicate coating either to enhance adhesion or enhance the regularity of the surface of the finished product.

The mineral silicate coating is applied to the prepared surface, whether primed or not, and allowed to dry. The drying process can be sped up by application of energy, for example, as direct radiation heating such as IR or NIR, or microwave, or indirectly by use of hot air.

The mineral silicate coating can be formed from multiple layers of mineral silicate. One to four coats is expected to be suitable for most applications. Optionally, one or more further coats of mineral silicates are applied with optional sanding and drying as described above between each coating.

In some embodiments, the final mineral silicate coating is sanded to achieve a smooth surface, for example using a high grit sandpaper number such as P400 or higher.

The mineral silicate coating is inherently resistant to mould and fungal growth due to their high alkalinity and provide long term mould and fungal growth resistance. The inorganic nature of the coating also means that there is nothing for algae to feed on preventing algae build up on the coating.

Painting is not limited to mineral silicate paints. In the examples described later, various paints are used, for example a water based enamel paint (White Knight splashes Cherry Red). Other options used were solvent based timber stain combined with a clear polyurethane (Feast Watson, Black Japan™ SATIN), and a 100% acrylic self-priming exterior paint (Dulux® Weathershield Exterior Low Sheen).
Printing In some embodiments, the impregnated/coated nonwoven glass fibre material surface is printed. Various printing methods may be used, for example inkjet printing. Screen printing or dye sublimation are optional methods of printing. It is an option to apply a print receiving layer before printing, for example an inkjet receiving layer. Inkjet printing is a preferred printing method. Optionally, the inkjet printing may use ceramic inks. Durst Gamma and EFI Cretaprint printers are examples of suitable ceramic inkjet printers.

Optionally, a protective coating is applied to the surface of the printed impregnated/coated nonwoven glass fibre material layer.

A lenticular sheet material can be applied above the printed impregnated/coated nonwoven glass fibre material layer.
Protective Coating The impregnated/coated nonwoven glass fibre material layer whether printed or not may have a protective coating applied. When the impregnated/coated nonwoven glass fibre material layer is printed, optionally a clear protective coating is applied. When the impregnated/coated nonwoven glass fibre material layer is not printed a paint may be applied. The protective coating may contain additives to enhance the exterior surface, for example hard particles of corundum are used to reduce abrasion, and/or antibacterial or antimicrobial substances are incorporated in the surface, and/or a photo-catalytic material. The protective coating can be a glue suitable for subsequent application of flock material (flocking). The protective coating can include an intumescent material to improve fire resistance. The impregnated/coated nonwoven glass fibre material surface and/or upper protective coating may contain thermochromic materials (Yamamoto Chemicals Inc., Japan) that change colour depending on the temperature of the surface. The thermochromic material may change colour due to exposure to heat, or may produce an irreversible colour change, for example used for laser marking.

The protective coating on the impregnated/coated nonwoven glass fibre material layer can be selected for interior applications or exterior applications to reduce degradation of the surface of the impregnated/coated nonwoven glass fibre material coated wood-based panel. A non-limiting example of a protective coating for exterior applications would be a fluororesin, such as Fluorex from Chugoku Marine Paints, Ltd.

Another suitable protective coating is DiamondCoat from Crommelin®. The protective coating is optionally an acid cured lacquer.

Furthermore, additives may be incorporated to enhance cleanability or anti-soiling of the laminate surface, for example Du Pont™ Zonyl® fluorosurfactant.
Heat Sensitive Materials Where the laminate is prepared with no or minimal heating, then heat-sensitive materials could be included, for example encapsulated fragrances from Givaudan (Switzerland).
Processing If the woodpanel surface is not homogenous and/or prone to variations in water absorption, for example from the adhesive, or primer, or subsequent impregnation of the nonwoven glass fibre material layer, a process step to coat the substrate material with a primer and optionally a light sanding before adhesion of the nonwoven glass fibre material layer is a method to reduce surface swelling.

The impregnation/coating of the nonwoven glass fibre material with the mixture of styrene maleic anhydride copolymer amic acid, cyanuric acid and melamine could be effected sheet wise or preferably through a continuous impregnation machine, for example VITS (Langenfeld Germany) impregnation line with flotation driers. The impregnation line could have a first saturation section, intermediate drying, followed by one or more coating stations and further drying. The end of the impregnation line could have sheeting or re-rolling capability, meaning to start as a roll and finish as either a sheet format or a roll. The prepared impregnated/coated nonwoven glass fibre material is then adhered to the substrate and optionally further impregnation/coating occurs by applying the mixture of styrene maleic anhydride copolymer amic acid, cyanuric acid and melamine into/onto the surface of the partially impregnated/coated nonwoven material surface. If the nonwoven glass fibre material is only partially impregnated, a further impregnation/coating may occur after the partially impregnated nonwoven glass fibre material is adhered to the substrate.

Optionally, after adhering the impregnated/coated nonwoven glass fibre material to the substrate, the surface of the impregnated/coated nonwoven glass fibre material layer is sanded and primed, and then printed or painted. Optionally, an ink receiving layer is applied to the surface of the impregnated/coated nonwoven glass fibre material layer before or after adhesion of the intermediate layer, (s) to the substrate material.
Products Including Laminates of the Invention The laminates of the invention can be applied to form among other options, a wall, a ceiling, a floor, a room divider, a benchtop, cabinetry and/or furniture. Generally, the laminate surface of the invention are applied as the visible surface of the wall, ceiling, floor, room divider, benchtop, cabinetry and/or furniture. The second surface may also have a impregnated/coated nonwoven glass fibre material surface, or when not being the visible surface in use may be coated or have a material applied to provide a specific function, such as heat reflection, electromagnetic radiation reflection, a moisture barrier, an airtight barrier, sound dampening, or any combination of these functions.

EXAMPLES

Example 1—Impregnation of Glass Fibre Tissue and Adhering to OSB

A nonwoven glassfibre tissue 70 g/m$^2$ from Ahlstrom-Munksjo Finland ref. GFT-25K$_{13}$-70 was impregnated by hand with a mixture comprising styrene maleic anhydride copolymer amic acid, cyanuric acid and melamine and water. The weight of the impregnated glassfibre tissue after drying was 325 g/m2 inclusive remaining volatiles and the impregnated glassfibre was adhered to a 6 mm OSB panel (Egger OSB'race) using a multipurpose adhesive (Selleys® ALLFIX). A clear mineral silicate primer (Porter's Mineral Silicate Primer, containing 1-10% potassium silicate) was applied to the impregnated nonwoven glassfibre material surface and allowed to dry. Three coatings of a non-pigmented mineral silicate stain (Porter's Mineral Silicate Stain "Clear") was applied to the primed impregnated nonwoven glass fibre surface. The combined amount of mineral silicate primer and mineral silicate satin was approximately 12 g/m$^2$. There is no TiO2 used in the surfacing materials, nevertheless the panel surface exhibits excellent opacity in as much as the various light and dark colours of the wood strands are not visible and the final panel surface exhibits a white coloured exterior.

Subsequently, half of Example 1 was painted with an enamel paint (Cherry Red, White Knight splashes).

Furthermore, a drop saw was used to test the panel for quality of cutting.

See FIG. 1.

Example 2—Adhering Glass Fibre Tissue to OSB and Impregnating

A thin coating of the mixture styrene maleic anhydride copolymer amic acid, cyanuric acid and melamine was applied to the surface of a 6 mm OSB panel (Egger OSB'race) using a spatula to remove any excess material. After allowing the coated surface to dry it was sanded with Grit P80 sandpaper to create a clean smooth surface. The weight increase of the panel was 74 g/m$^2$.

Subsequently, a nonwoven glassfibre tissue from Ahlstrom-Munksjo Finland ref. GFT-25K-13-70 was adhered to the coated/sanded 6 mm OSB panel using a multipurpose adhesive (Selleys® ALLFIX). A mixture comprising styrene maleic anhydride copolymer amic acid, cyanuric acid and melamine was applied to the surface of the nonwoven glass fibre material under hand pressure to force the mixture into the interstices of the nonwoven glass fibre material. The amount of styrene maleic anhydride copolymer amic acid, cyanuric acid and melamine was approximately 430 g/m$^2$.

Subsequently, half of Example 2 was painted with a 100% acrylic self-priming exterior paint (Dulux® Weathershield Low Sheen, Vivid White).

See FIG. 2

Example 3—Painting the Impregnated Nonwoven Glass Fibre Surface on OSB

A thin coating of the mixture styrene maleic anhydride copolymer amic acid, cyanuric acid and melamine was applied to the surface of a 6 mm OSB panel (Egger OSB'race) using a spatula to remove any excess material. After allowing the coated surface to dry it was sanded with Grit P80 sandpaper to create a clean smooth surface. The weight increase of the panel was 127 g/m$^2$.

Subsequently, a nonwoven glassfibre tissue from Ahlstrom-Munksjo Finland ref. GFT-25K-13-70 was adhered to the coated/sanded 6 mm OSB panel using a multipurpose adhesive (Selleys® ALLFIX). A mixture comprising styrene maleic anhydride copolymer amic acid, cyanuric acid and melamine was applied to the surface of the nonwoven glass fibre material under hand pressure to force the mixture into the interstices of the nonwoven glass fibre material. The amount of styrene maleic anhydride copolymer amic acid, cyanuric acid and melamine was approximately 227 g/m$^2$.

Subsequently, a mineral silicate primer (10 g/m$^2$ Porter's Mineral Silicate Primer) was applied and immediately partially dried with hot air. After further ambient drying a light sanding removed approximately 6 g/m$^2$ of the surface material. After sanding two applications of a mineral silicate stain (Porters Mineral Silicate Satin "Clear") were applied, in total 74 g/m$^2$.

Subsequently, half of Example was painted with a 100% acrylic self-priming exterior paint (Dulux® Weathershield Low Sheen, Vivid White).

See FIG. 3

Example 4—Modified Impregnation Material to Create Texture

A nonwoven glassfibre tissue from Ahlstrom-Munksjo Finland ref. GFT-25K-13-70 was adhered to a 6 mm OSB panel (Egger OSB'race) using a multipurpose adhesive (Selleys® ALLFIX). A mixture comprising styrene maleic anhydride copolymer amic acid, cyanuric acid and melamine modified with magnesium sulphate was applied to the surface of the nonwoven glass fibre material under hand pressure to force the mixture into the interstices of the nonwoven glass fibre material. The amount of impregnating material was approximately 635 g/m$^2$ of styrene maleic anhydride copolymer amic acid, cyanuric acid and melamine, and 72 g/m$^2$ of magnesium sulphate.

Subsequently, a primer was applied (10 g/m$^2$ Porter's Mineral Silicate Primer), followed by one application of a mineral silicate paint (120 g/m$^2$ Porters Mineral Silicate Stain "Clear").

The inclusion of magnesium sulphate heptahydrate into the mixture of styrene maleic anhydride copolymer amic acid, cyanuric acid and melamine caused the surface of the coated laminate to appear cracked (see FIG. 4a and FIG. 4b for final result), therefore the surface was sanded with a grit P40 sandpaper to remove approximately 430 g/m$^2$. The cracked/distressed appearance of the surface presents a random natural distressed timber look.

Subsequently, half of Example 4 was painted with a 100% acrylic self-priming exterior paint (Dulux® Weathershield Low Sheen, Vivid White).

See FIG. 4a and FIG. 4b.

Example 5—Depicting 3 Stages in the Making of a Laminate of the Invention

See FIG. 5
Left: An uncoated 6 mm OSB panel (Egger OSB'race)
Middle: same 6 mm OSB panel with impregnated nonwoven glass fibre material impregnated with a mixture of styrene maleic anhydride copolymer amic acid, cyanuric acid and melamine
Right: same 6 mm OSB panel with impregnated nonwoven glass fibre material impregnated with a mixture of styrene maleic anhydride copolymer amic acid, cyanuric acid and melamine, and painted with a mineral silicate paint Example 6—SPS Steel Plate Plastic Composite Substrate Sandwich Plate System (SPS) is a composite material comprising two metal plates separated by an elastomer core, which transfers shear between each plate. Being materials with different surface properties such as surface adhesion, laminating the impregnated nonwoven glass fibre material to the SPS presents a uniform surface structure ready for printing or painting. An example was made using a printed sample. The original sample weighed 43 kg/m$^2$, and a nonwoven glass fibre material of 70 g/m$^2$ was glued to the SPS sample. Subsequently, the nonwoven glass fibre material was impregnated with approximately 345 g/m$^2$ of the mixture of styrene maleic anhydride copolymer amic acid, cyanuric acid and melamine. After drying the laminate surface was sanded and a coating of Crommmelin® DiamondCoat was applied, approximately 177 g/m².

Figure 6:
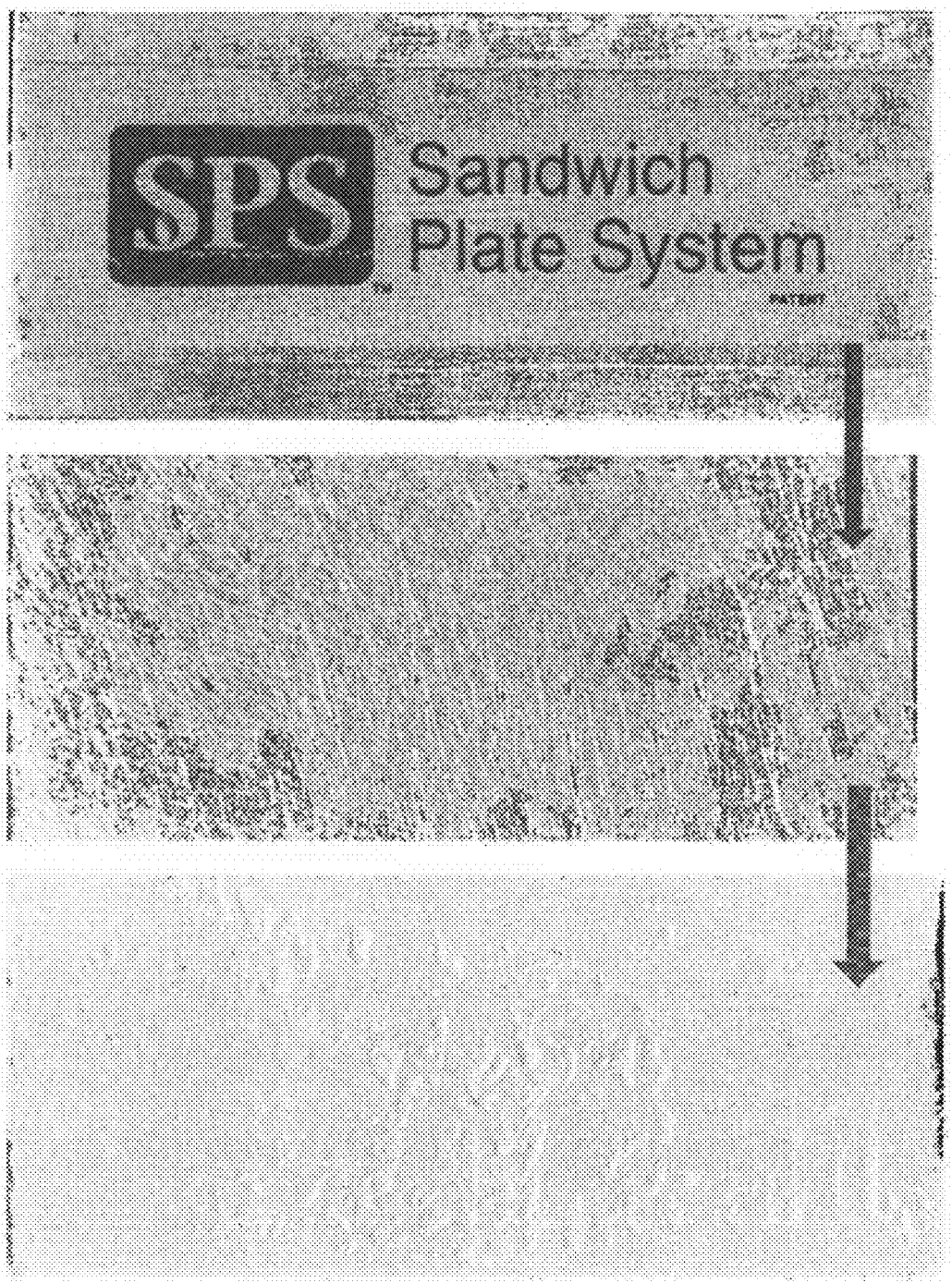
FIG. 6 shows an SPS steel plate plastic composite substrate.

See FIG. 6.

Example 7—Sealing Surface of Impregnated Nonwoven Glass Fibre Surface

A nonwoven glassfibre tissue from Ahlstrom-Munksjo Finland ref. GFT-25K-13-70 was adhered to a 6 mm OSB panel (Egger OSB'race) using a multipurpose adhesive (Selleys® ALLFIX). A mixture comprising styrene maleic anhydride copolymer amic acid, cyanuric acid and melamine was applied to the surface of the nonwoven glass fibre material under hand pressure to force the mixture into the interstices of the nonwoven glass fibre material. The amount of styrene maleic anhydride copolymer amic acid, cyanuric acid and melamine was approximately 358 g/m².

Subsequently, a mineral silicate primer (9 g/m² Porter's Mineral Silicate Primer) was applied to the impregnated nonwoven glass fibre material surface. Later, 3 applications of a mineral silicate stain (Porter's Mineral Silicate Stain "Clear") were applied to the primed impregnated nonwoven glass fibre surface, in total approximately 93 g/m².

Furthermore, a drop saw was used to test the panel for quality of cutting.

Subsequently, half of Example 7 was painted with Crommelin® DiamondCoat Gloss sealer. According to the Crommelin® datasheet, DiamondCoat is a surface coating sealer imparting 'wet look' colour enhancement and hard wearing protection.

See FIG. 7

Example 8—Impregnation Material Using Melamine Cyanurate

A nonwoven glassfibre tissue from Ahlstrom-Munksjo Finland ref. GFT-25K-13-70 was adhered to a 6 mm OSB panel (Egger OSB'race) using a multipurpose adhesive (Selleys® ALLFIX). A mixture comprising styrene maleic anhydride copolymer amic acid, melamine cyanurate and water was applied to the surface of the nonwoven glass fibre material under hand pressure to force the mixture into the interstices of the nonwoven glass fibre material. The amount of impregnating material was approximately 420 g/m² of styrene maleic anhydride copolymer amic acid and melamine cyanurate. After allowing the surface to dry the surface was sanded removing approximately 30 g/m² of material.

Subsequently, half of example 8 was painted with a water based enamel paint (Dulux® Aquanamel® semi gloss Subiaco Sand).

See FIG. 8

Printing of the Impregnated/Coated Nonwoven Glass Fibre Material

Laminate panels prepared with an impregnated/coated nonwoven glass fibre material layer according to the invention are suitable for printing. The method of printing is freely chosen from any suitable printing method. Inkjet printing is one option, screen printing another option. Another option is dye sublimation using for example Texart Dye-sublimation printing machinery from Roland (Roland DG Corp. Hamamatsu Japan), while another example being VersaUV flatbed printer (RolandDG).

Furthermore, the application of ceramic inkjet printing inks using a ceramic inkjet printer from the Durst Gamma series sold by Durst Group, or the Cretaprint inkjet printer sold by EFI provide large scale ceramic inkjet printing with visual and tactile surface properties.

It will be understood that the invention disclosed and defined in this specification extends to all alternative combinations of two or more of the individual features mentioned or evident from the text or drawings. All of these combinations constitute various alternative aspects of the invention.

The invention claimed is:

1. A laminate including a substrate material having at least a first surface, and one or more nonwoven glass fibre material layers adhered to at least the first surface, characterised in that the nonwoven glass fibre material is;
   a. impregnated and or coated with a mixture of styrene maleic anhydride copolymer amic acid, cyanuric acid and melamine before adhesion to the substrate material, or
   b. is impregnated and or coated with a mixture of styrene maleic anhydride copolymer amic acid, cyanuric acid and melamine after adhesion to the substrate material, or
   c. is partially impregnated or coated with a mixture of styrene maleic anhydride copolymer amic acid, cyanuric acid and melamine then adhered to the substrate material and a further impregnation and or coating of the styrene maleic anhydride copolymer amic acid, cyanuric acid and melamine is applied to the surface of the nonwoven glass fibre material already partially impregnated/coated with styrene maleic anhydride copolymer amic acid, cyanuric acid and melamine.

2. The laminate according to claim 1, wherein the styrene maleic anhydride amic acid, cyanuric acid and melamine composition includes pigments or dyes to provide a desired colour change.

3. A laminate with a first surface according to claim 1, wherein the laminate further comprises a second surface opposing the first surface and one or more material layers are adhered to the second surface to provide one or more functional attributes selected from the group consisting of heat reflection, electromagnetic radiation reflection, a moisture barrier, an airtight barrier, sound dampening.

4. The laminate according to claim 1, wherein a primer or a print receiving layer is applied to the impregnated/coated nonwoven glass fibre material layer and the impregnated/coated nonwoven glass fibre material layer is subsequently printed, or painted, and/or sealed with a protective layer.

5. The laminate according to claim 4, wherein the printing method is inkjet printing and optionally the inkjet printing uses ceramic inks.

6. The laminate according to claim 4, wherein the paint is an intumescent paint.

7. The laminate according to claim 1, wherein the surface of the laminate having the impregnated nonwoven glass fibre material layer also contains one or more materials selected from the group consisting of antimicrobial material or antimicrobial materials, a thermochromic material, a fluorosurfactant, abrasion resistant hard particles, a photocatalyst, and a flock material.

8. The laminate of claim 4, wherein the unprinted or printed, or unpainted or painted impregnated nonwoven glass fibre material layer has a protective coating.

9. The laminate according to claim 1, wherein the surface of the laminate has an embossing into the surface and or structure created on the surface to provide a visual and or tactile effect achieved by using an embossing tool or by printing or by chemical means.

10. The laminate according to claim 9, wherein the chemical means for achieving a visual or tactile effect are by the addition of magnesium sulphate to the impregnating/coating material.

11. The laminate according to claim 1, wherein the substrate material is a wood-based panel, metal or plastic material.

12. The laminate according to claim 11, wherein the wood-based panel is any of plywood, particleboard, fibreboard, oriented strand board, laminated veneer lumber, cross laminated timber or solid wood.

13. The laminate according to claim 12, wherein the wood-based panel is manufactured with a no added formaldehyde binder and the impregnated/coated nonwoven glass fibre material layer is painted with a mineral silicate paint.

14. A process for preparing a woodpanel substrate wherein the woodpanel substrate is coated with a composition of a mixture of styrene maleic anhydride copolymer amic acid, cyanuric acid and melamine and optionally sanded to provide a uniform surface prior to adhering a nonwoven glass fibre material or impregnated/coated nonwoven glass fibre material to the substrate.

15. A laminate prepared according to claim 14, wherein the coating is a composition of a mixture of styrene maleic anhydride copolymer amic acid, cyanuric acid and melamine.

16. A process for preparing a laminate including adhering one or more intermediate nonwoven glass fibre material layers to at least a first surface of a substrate material, wherein the nonwoven glass fibre material is impregnated/coated with a mixture of styrene maleic anhydride copolymer amic acid, cyanuric acid and melamine before being adhered to the substrate, or the nonwoven glass fibre material is impregnated/coated with a mixture of styrene maleic anhydride copolymer amic acid, cyanuric acid and melamine after adhesion to the substrate, or the nonwoven glass fibre material is partially impregnated/coated with a mixture of styrene maleic anhydride copolymer amic acid, cyanuric acid and melamine before being adhered to the substrate and further impregnated/coated with a mixture of styrene maleic anhydride copolymer amic acid, cyanuric acid and melamine after being adhered to the substrate.

17. A process for preparing a laminate wherein a nonwoven glass fibre material impregnated/coated with a mixture of styrene maleic anhydride copolymer amic acid, cyanuric acid and melamine is printed or painted to create a decorative effect and optionally applying a protective coating to the unprinted or printed, or unpainted or painted impregnated/coated nonwoven glass fibre material surface.

* * * * *